TRANSMISSION LINE HAVING VARIABLY BIASED FERROELECTRIC DIELECTRIC, USEFUL AS VARIABLE ATTENUATOR OR VARIABLE DELAY LINE

Filed May 15, 1961

INVENTOR
EDWARD F. HAHN

BY Elmer Gallister
AGENT

United States Patent Office 3,167,728
Patented Jan. 26, 1965

3,167,728
TRANSMISSION LINE HAVING VARIABLY BIASED FERROELECTRIC DIELECTRIC, USEFUL AS VARIABLE ATTENUATOR OR VARIABLE DELAY LINE

Edward F. Hahn, Poughkeepsie, N.Y., assignor to International Business Machines Corporation, New York, N.Y., a corporation of New York
Filed May 15, 1961, Ser. No. 109,918
5 Claims. (Cl. 333—30)

This invention relates to electromagnetic wave transmitting devices and more particularly to radio frequency variable attenuators, variable filters and variable delay lines.

Radio frequency variable attenuators are known in the prior art; however, the attenuation of these devices can only be varied by physically moving some component part of the device. For example, the prior art shows attenuators the attenuation of which can be changed by physically moving a piece of material into and out of the electromagnetic field generated by waves propagating through the attenuator. Other variable attenuators may be constructed by making wave guides, the physical dimensions of which can be varied.

The present invention provides a variable attenuator, the attenuation of which may be varied by varying the D.C. bias applied to one component of the attenuator. The variable attenuator of the present invention is constructed by placing ferroelectric material in the electromagnetic field generated by the waves propagating through the attenuator. A variable bias is applied to the ferroelectric material and by varying the bias the attenuation of the wave propagating through the attenuator is varied.

The attenuation achieved by the present invention is due to two distinct and separable phenomena. First, some of the attenuation is due to heat ($I^2R$) losses in the conductors which bound the propagating wave (i.e. in the conductors of a transmission line or in the walls of a wave guide). Second, the major portion of the attenuation is due to losses in the dielectric material itself. The mechanism through which the losses in the dielectric material occur is not completely understood; however, the losses are much more significant than the losses due to the heat generated in the conductors which bound the propagating wave.

It is well known that varying the bias applied to a ferroelectric crystal will vary its dielectric constant; however, it has not previously been known that variations in bias would cause variations in the attenuation due to the energy dissipated internally in the ferroelectric material. Since this variation in attenuation due to energy dissipated internally in the ferroelectric material is much more significant than the relatively fixed heat loss in the conductors, the realization of devices which have wide ranges of attenuation is possible.

The attenuation of devices constructed in accordance with the present invention also varies with changes in frequency, increasing with increases in frequency, hence, the devices are useful as variable low pass filters.

Furthermore since changes in bias applied to the ferroelectric crystals changes the dielectric constant of the crystals, the delay which an electromagnetic wave propagating through the device experiences varies with changes in bias, making the device useful as a variable delay line.

An object of the present invention is to provide a radio frequency attenuator, the attenuation of which can be easily varied within a considerable range of values.

Another object of the present invention is to provide a wave transmitting device the attenuation of which can be varied without making any mechanical adjustments to the wave transmitting device.

Yet another object of the present invention is to provide a wave transmitting device, the attenuation of which can be electrically varied.

Still another object of the present invention is to provide a variable radio frequency attenuator consistent with the above objects which has a high characteristic impedance, provides substantial attenuation and has a small size.

Still another object of the present invention is to provide a radio frequency attenuator consistent with the above objects, the attenuation of which is dependent upon frequency.

Yet another object of the present invention is to provide an improved variable delay line the delay of which can be electrically varied.

Still another object of the present invention is to provide an improved variable low pass filter.

The foregoing other objects, features and advantages of the invention will be apparent from the following more particular description of a preferred embodiment of the invention as illustrated in the accompanying drawing.

Figure 2:
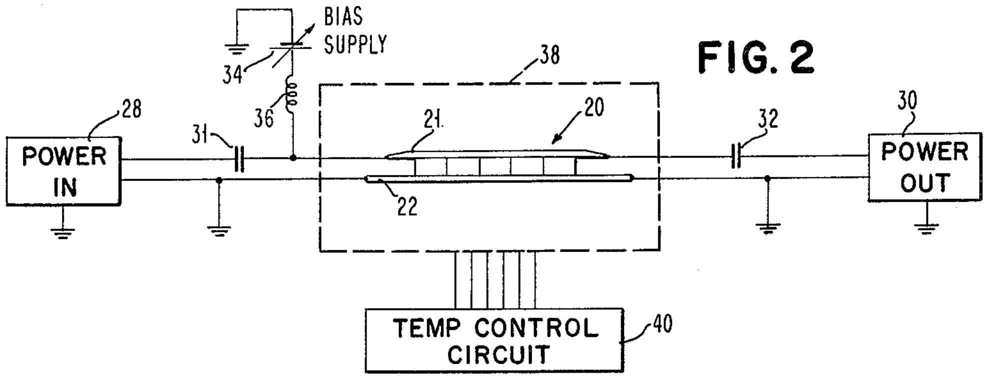
FIGURE 2 shows the circuit in which the wave transmitting device is connected and the temperature control device.

The particular embodiment of the invention shown herein consists of a transmission line attenuator 20 whose electrodes 21 and 22 are separated by crystals 23*a* to 23*e* of the ferroelectric material tri-glycine sulfate (hereinafter called TGS). The attenuator 20 is connected in a circuit (FIGURE 2) which has a power input means 28 for supplying radio frequency waves, a power output means 30, a capacitor 31 isolating the attenuator 20 from the power input means 28 with respect to D.C. potentials, a capacitor 32 isolating the attenuator 20 from the output means 30 with respect to D.C. potentials, a variable bias supply 34 for applying various D.C. potentials between the electrodes 21 and 22 and a coil 36 to prevent the dissipation of radio frequency energy in the bias supply 34. The connections between the attenuator and the input and output can be made by well-known techniques such as by strip lines. The attenuator is physically positioned in an oven designated by the dotted line 38. The temperature control circuit 40 maintains oven 38 at a constant temperature of 50 degrees centigrade which is 0.2 degree centigrade above the Curie temperature of the TGS crystals 23*a* to 23*e*.

Figure 3:
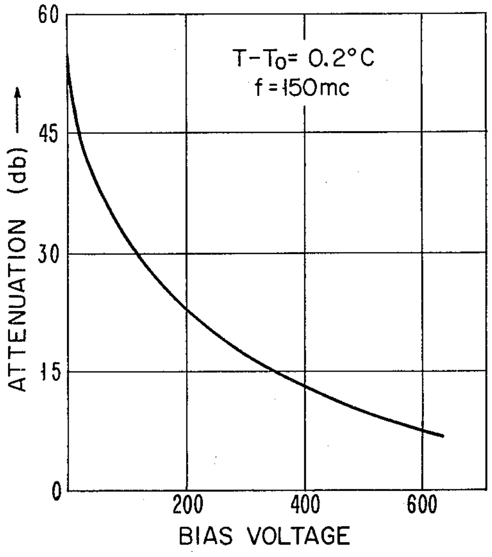
FIGURE 3 is a graph showing the attenuation of the device.

By varying the magnitude of the bias supply 34 the attenuation of the electromagnetic energy propagating between the power input means 28 and the power output means 30 can be changed. The possible variation in attenuation is shown in FIGURE 3. By varying the bias supply between 0 and 600 volts the attenuation varies between 5 and 60 decibels (when the attenuator is operated at a frequency of 150 megacycles).

TGS is a ferroelectric material the dielectric constant of which is voltage dependent when the material is at a temperature above its Curie point which is 49.8 degrees centigrade. By applying a D.C. potential across a crystal of TGS the dielectric constant of the crystal is changed. The degree of change in the dielectric constant is dependent upon the magnitude of the D.C. potential applied. The properties of TGS are discussed in the IBM Journal of Research and Development, volume 2, Number 3 (1958), by S. Triebwasser.

As is explained in the above referenced article the dielectric constant of TGS is extremely temperature sensitive and hence, the attenuator must be kept at a constant uniform temperature which does not vary plus or minus more than 0.01 degree centigrade. An oven which is capable of maintaining temperature within the desired range may be constructed by providing an oven which has a temperature sensing device which consists of a crystal of TGS, the oven controls being responsive to the dielectric constant of the ferroelectric crystal. Ovens which are capable of maintaining a temperature to within 0.01 of a degree of the desired temperature are known in the prior art and no further description of such ovens will be given herein.

Figure 1:
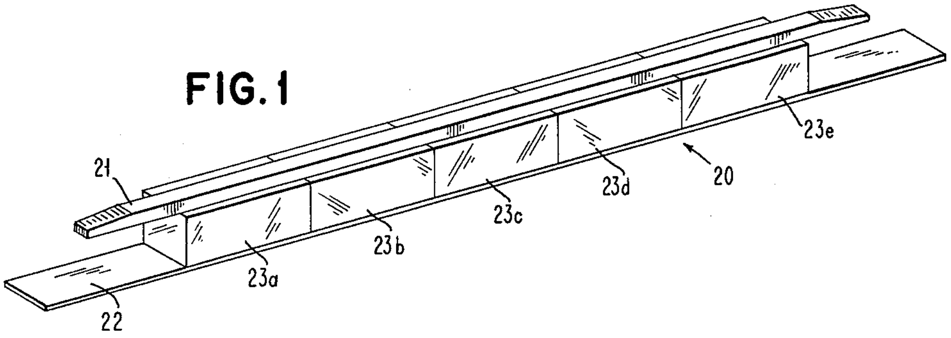
FIGURE 1 shows the construction of a wave transmitting device which includes a ferroelectric material.

As shown in FIGURE 3 the attenuation of the attenuator shown in FIGURE 1 varies from 5 to 60 decibels. In order to produce the attenuation shown in the graph of FIGURE 3, the attenuator is operated at a temperature 0.2 degree centigrade above the Curie temperature of the TGS and source 28 is operated at a frequency of 150 megacycles.

For the particular illustrative embodiment shown herein the physical dimensions of the attenuator 20 are as follows:

| | |
|---|---|
| Thickness of crystals (from electrode to electrode) | .01 meter. |
| Width of top electrode | .00254 meter. |
| Width of bottom electrode | .01 meter. |
| Average length of sections | .0252 meter (there are five sections). |

Several aspects of the above dimensions are important. (*a*) The crystal thickness gives the line a relatively high characteristic impedance (in the neighborhood of 8.5 ohms when the attenuator is operated at a frequency of 150 mc.). (*b*) The width of the electrodes reduces the the propagation of waves other than those in the desired TEM mode. (*c*) Joining several crystals together gives attenuation of up to 60 db. Naturally, the characteristic impedance varies somewhat depending upon the magnitude of the bias and frequency of the power source.

Each section of the line consists of a single crystal of TGS. Each section of the line can by itself be considered as an attenuator. The surfaces of the crystals are polished and the electrodes are attached to the crystals by a vacuum deposition process.

In addition to the changes in attenuation that can be produced by changing the magnitude of the bias supply, the attenuation of the device shown can be increased (even if the bias is maintained constant) by increasing the frequency of the power supply 28. The fact that the attenuation of the device changes with frequency is not unusual; however, the changes in attenuation which the device shown exhibits are several orders of magnitude larger than those which would be expected. This characteristic of the device makes it applicable as an adjustable low pass filter.

Varying the bias applied to the TGS crystals varies their dielectric constant and therefore varying the bias varies the time required for electromagnetic waves to propagate through the device. Hence, the device is useful as a variable delay line.

Although TGS crystals are preferred because of the wide variations in attenuation which devices constructed with them exhibit (both when the frequency is held constant and the bias varied, and when the bias is held constant the frequency is varied) various other ferroelectric materials known in the art could be used instead of TGS, such as barium titinate ($BaTiO_3$), potassium dehydrogen arsenate ($KH_2AsO_4$), potassium dehydrogen phosphate ($KH_2PO_4$) or Rochelle salt (double tartrate of sodium and potassium with four waters of hydration, $NaKC_4H_4O_6 \cdot 4H_2O$).

Although the specific embodiment of the invention shown herein is a transmission line attenuator, the invention is not limited to transmission line attenuators. The ferroelectric material could be placed inside a wave guide rather than between the electrodes of a transmission line.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A variable radio frequency attenuator comprising input means for generating 150 mc. electromagnetic waves, output means adapted to receive radio frequency electromagnetic waves, transmission means having two electrodes separated by a plurality of crystals of tri-glycine sulfate, said crystals having a thickness of 0.01 meter whereby said transmission means has a characteristic impedance of approximately 8.5 ohms, means for maintaining said crystals at a constant temperature slightly above their Curie point, capacitive coupling means between said input means and said transmission means, capacitive coupling means between said transmission means and said output means, means for applying a variable D.C. bias between said electrodes whereby the attenuating of said transmission means can be varied between five and sixty decibels.

2. A radio frequency variable attenuator comprising input means for generating radio frequency electromagnetic waves, output means adapted to receive radio frequency electromagnetic waves, transmission means having two electrodes separated by a plurality of crystals of tri-glycine sulfate, means for maintaining said crystals at a constant temperature slightly above their Curie point, capacitive coupling means between said input means and said transmission means, capacitive coupling means between said transmission means and said output means, means for applying a variable D.C. bias between said electrodes whereby the attenuation of said transmission means can be varied between five and sixty decibels.

3. A variable radio frequency attenuator comprising means for generating radio frequency energy, output means adapted to receive radio frequency energy, a two electrode transmission line connecting said input means to said output means, at least one tri-glycine sulfate crystal between said electrodes, means for applying a variable D.C. bias to said tri-glycine sulfate crystal to control the attenuation of said transmission line and means for maintaining said crystal at a constant temperature slightly above its Curie point.

4. A variable attenuator comprising input means for generating electromagnetic waves, output means adapted to receive electromagnetic waves, wave guiding means for transmitting electromagnetic waves from said input means to said output means through a fixed area of space, means for maintaining said crystal at a constant temperature slightly above its Curie point, tri-glycine sulfate crystals in said space, means for applying a variable D.C. bias to said tri-glycine sulfate crystals material.

5. A variable delay device comprising, wave generating means for generating electromagnetic waves; wave receiving means for receiving electromagnetic waves; wave transmitting means connecting said wave generating means and said wave receiving means, said wave transmitting means comprising two conductors separated by crystals of ferroelectric material; and means for varying the bias applied to said ferroelectric material, thereby varying the time required for electromagnetic waves to propagate from said wave generating means to said wave receiving means.

References Cited in the file of this patent

UNITED STATES PATENTS

| | | |
|---|---|---|
| 2,555,959 | Curtis | June 5, 1951 |
| 2,745,069 | Hewitt | May 8, 1956 |
| 2,748,353 | Hogan | May 29, 1956 |
| 2,838,735 | Davis | June 10, 1958 |
| 2,920,292 | Scovil | Jan. 5, 1960 |
| 2,922,125 | Suhl | Jan. 19, 1960 |
| 2,944,231 | Howell et al. | July 5, 1960 |
| 2,951,220 | Miller | Aug. 30, 1960 |
| 2,969,512 | Jaffe | Jan. 24, 1961 |
| 2,988,714 | Tebon | June 13, 1961 |
| 3,076,946 | Hewitt | Feb. 5, 1963 |